(12) United States Patent
Glickman et al.

(10) Patent No.: US 11,214,313 B2
(45) Date of Patent: Jan. 4, 2022

(54) VEHICLE ASSEMBLIES WITH LOOSE LAYERED BUILD COMPONENTS

(71) Applicant: FORD GLOBAL TECHNOLOGIES, LLC, Dearborn, MI (US)

(72) Inventors: David Brian Glickman, Southfield, MI (US); Steve Michael Lakatos, Plymouth, MI (US); Kevin Berington Johnson, Plymouth, MI (US); Adam Michael Polito, Farmington Hills, MI (US); Vince S. Carnes, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 175 days.

(21) Appl. No.: 16/707,038

(22) Filed: Dec. 9, 2019

(65) Prior Publication Data

US 2021/0171118 A1  Jun. 10, 2021

(51) Int. Cl.
*B62D 25/08* (2006.01)
*B60R 19/52* (2006.01)
*B60R 19/18* (2006.01)
*B60Q 1/04* (2006.01)
*B62D 29/00* (2006.01)

(52) U.S. Cl.
CPC .......... *B62D 25/085* (2013.01); *B60R 19/52* (2013.01); *B60Q 1/045* (2013.01); *B60R 2019/1886* (2013.01); *B60R 2019/525* (2013.01); *B62D 29/004* (2013.01)

(58) Field of Classification Search
CPC .... B62D 25/085; B62D 25/084; B60R 19/52; B60R 2019/525; B60R 2019/527; B60R 2019/1886; B60Q 1/045; B60Q 1/0458; B60Q 1/0483
USPC .......................................... 296/193.1, 193.09
See application file for complete search history.

(56) References Cited

U.S. PATENT DOCUMENTS

| | | | |
|---|---|---|---|
| 6,581,252 B1 | 6/2003 | Sedlock et al. | |
| 7,464,984 B1 | 12/2008 | McDaniel | |
| 7,690,703 B2* | 4/2010 | Maruko | B60R 19/52 293/102 |
| 7,896,409 B2* | 3/2011 | Abdelnour | B60R 19/52 293/115 |
| 9,707,916 B2* | 7/2017 | Mohacsi | B60R 19/52 |
| 9,776,585 B2* | 10/2017 | Wey | B60R 19/52 |
| 10,272,819 B2 | 4/2019 | Glickman et al. | |
| 10,704,756 B2* | 7/2020 | Glickman | B60Q 1/263 |
| 10,926,690 B2* | 2/2021 | Tanabe | B60Q 1/0433 |
| 10,967,821 B2* | 4/2021 | Tanabe | B60R 19/24 |
| 2018/0186276 A1 | 7/2018 | Glickman et al. | |
| 2018/0186417 A1 | 7/2018 | Carroll et al. | |
| 2021/0101541 A1* | 4/2021 | Alvarez Viveros | B60R 19/18 |

\* cited by examiner

*Primary Examiner* — Jason S Morrow
(74) *Attorney, Agent, or Firm* — David Coppiellie; Carlson, Gaskey & Olds

(57) ABSTRACT

Vehicle assemblies may include a plurality of loose layered build components. One or more of the loose layered build components may include locating features for locating and supporting the component relative to other components of the assembly while still permitting movement of the component or one of the other components in at least one direction during the assembly process.

18 Claims, 4 Drawing Sheets

VEHICLE ASSEMBLIES WITH LOOSE LAYERED BUILD COMPONENTS

TECHNICAL FIELD

This disclosure relates to assemblies for motor vehicles, and more particularly to vehicle assemblies that include loose layered build components.

BACKGROUND

The assembly of vehicle front ends typically requires independent locating, supporting, and attachment features for connecting together various front end components. The front ends are typically assembled in a layer-by-layer fashion in which the visible exterior, or skin, components such as headlamp assemblies, grilles, and fascia are located, supported, and attached relative to one another and relative to underlying front end structural components. Adequate margins and flushness must be maintained between the various front end components during the assembly process.

SUMMARY

A vehicle front end assembly according to an exemplary aspect of the present disclosure includes, among other things, a structural component, a headlamp assembly positioned relative to the structural component, and a grille positioned relative to the structural component and the headlamp assembly. The grille includes a first locator adapted for centering the grille relative to the structural component, a second locator adapted for locating the grille relative to a first portion of the headlamp assembly, and a third locator for locating the grille relative to a second portion of the headlamp assembly.

In a further non-limiting embodiment of the foregoing assembly, the structural component includes a bolster.

In a further non-limiting embodiment of either of the foregoing assemblies, the structural component includes an active grille shutter (AGS) housing.

In a further non-limiting embodiment of any of the foregoing assemblies, the grille includes an additional first locator located on an opposite outboard side of the grille from the first locator.

In a further non-limiting embodiment of any of the foregoing assemblies, the first locator includes a tapered pin that engages a tapered slot provided by the structural component.

In a further non-limiting embodiment of any of the foregoing assemblies, the tapered slot is established by a first tapering wall of a first stanchion and a second tapering wall of a second stanchion of the structural component.

In a further non-limiting embodiment of any of the foregoing assemblies, the second locator includes a four-way locating pin that engages an opening formed in a lug of the headlamp assembly.

In a further non-limiting embodiment of any of the foregoing assemblies, the four-way locating pin includes a star pin having a tapered head that is received within the opening of the lug.

In a further non-limiting embodiment of any of the foregoing assemblies, the third locator includes a two-way locating pin that engages a slot formed in a lug of the headlamp assembly.

In a further non-limiting embodiment of any of the foregoing assemblies, the two-way locating pin includes a star pin having a tapered head that is received within the slot of the lug.

In a further non-limiting embodiment of any of the foregoing assemblies, the grille includes a fourth locator adapted for locating the grille relative to a fender.

In a further non-limiting embodiment of any of the foregoing assemblies, the fourth locator is a two-stage locator that includes a first locating pin that engages a first slot of a lug of the fender and a second locating pin that engages a second slot of the lug of the fender.

In a further non-limiting embodiment of any of the foregoing assemblies, the first locating pin includes an attachment clip received within the first slot and the second locating pin includes a tapered head received within the second slot.

In a further non-limiting embodiment of any of the foregoing assemblies, the grille includes a fifth locator that includes an attachment clip received within a slot of a second lug of the fender.

In a further non-limiting embodiment of any of the foregoing assemblies, the second locating pin extends underneath an extension of a housing of the headlamp assembly.

A vehicle front end assembly according to another exemplary aspect of the present disclosure includes, among other things, a structural component, a bolster secured to the structural component, an active grille shutter housing secured to the bolster to establish a grille opening reinforcement (GOR), a headlamp assembly secured relative to the active grille shutter housing and the bolster, a fender secured relative to the structural component, and a grille secured relative to the GOR, the headlamp assembly, and the fender. The grille includes a pair of tapered pins adapted for centering the grille relative to a pair of corresponding locators on the active grille shutter housing. The grille includes a four-way locating pin adapted for locating the grille relative to a first corresponding locator on the headlamp assembly. The grille includes a two-way locating pin adapted for locating the grille relative to a second corresponding locator on the headlamp assembly. The grille includes a two-stage locator adapter for locating the grille relative to a corresponding locator on the fender.

In a further non-limiting embodiment of the foregoing assembly, each corresponding locator of the pair of corresponding locators on the active grille shutter housing includes a tapered slot established by a first tapering wall of a first stanchion and a second tapering wall of a second stanchion on the active grille shutter housing.

In a further non-limiting embodiment of either of the foregoing assemblies, the first corresponding locator of the headlamp assembly includes a first slot formed in a first lug of the headlamp assembly.

In a further non-limiting embodiment of any of the foregoing assemblies, the second corresponding locator of the headlamp assembly includes a second slot formed in a second lug of the headlamp assembly.

In a further non-limiting embodiment of any of the foregoing assemblies, the corresponding locator of the fender includes a first slot and a second slot formed in a lug of the fender. The first slot receives an attachment clip of the two-stage locator and the second slot receives a tapered head of the two-stage locator.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle assemblies that are made up of a plurality of loose layered build components. One or more of the loose layered build components may include locating features for locating and supporting the component relative to other components of the assembly while still permitting movement of the component or one of the other components in at least one direction during the assembly process. These and other features of this disclosure are described in greater detail below.

Figure 1:
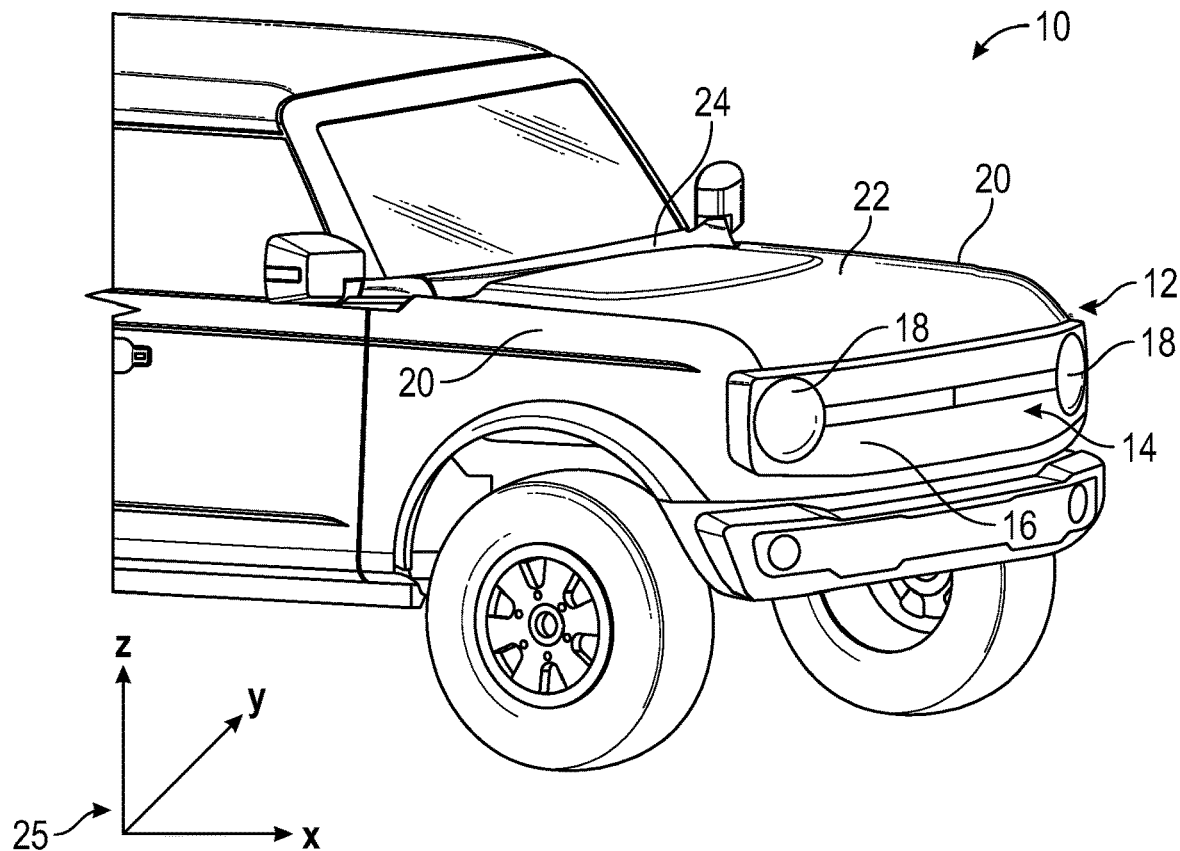
FIG. 1 is a front perspective view of a vehicle.

FIG. 1 illustrates select portions of a vehicle 10. The vehicle 10 may be a sport utility vehicle (SUV), a crossover, a car, a van, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to emphasize certain details of a particular component.

The vehicle 10 includes a front end 12. A front end assembly 14 of the front end 12, which may include multiple components including but not limited to a grille 16 and left and right headlamp assemblies 18, is mounted between left and right side fenders 20 of the vehicle 10. A hood 22 may be movably mounted laterally between the left and ride side fenders 20 and longitudinally between the front end assembly 14 and a cowl 24. The hood 22 may be opened to access an inner compartment (e.g., an engine compartment) of the vehicle 10.

The vehicle 10 is used herein to describe exemplary embodiments of vehicle assemblies, such as the front end assembly 14, which are made up of a plurality of loose layered build components. At least a portion of the loose layered build components of the front end assembly 14 may be "loosely" located, positioned, and supported relative to one another during the assembly process and prior to rigidly securing the components together and in place on the vehicle 10 in order to establish consistent margins and flushness between the components, thereby simplifying the overall assembly process.

The vehicle 10 of FIG. 1 is shown relative to a three dimensional Cartesian coordinate system 25 that generally orients the vehicle 10 relative to X, Y, and Z axis directions. Axis line X generally represents an X-axis direction along a length of the vehicle 10, the axis line Y generally represents a Y-axis direction across a width of the vehicle 10, and the axis line Z generally represents a Z-axis direction along a height of the vehicle 10. Reference may be made periodically throughout this specification to the X-axis, the Y-axis, and the Z-axis directions. These directions coincide with the X, Y, and Z directions indicated by the Cartesian coordinate system 25 shown in FIG. 1.

Figure 2:
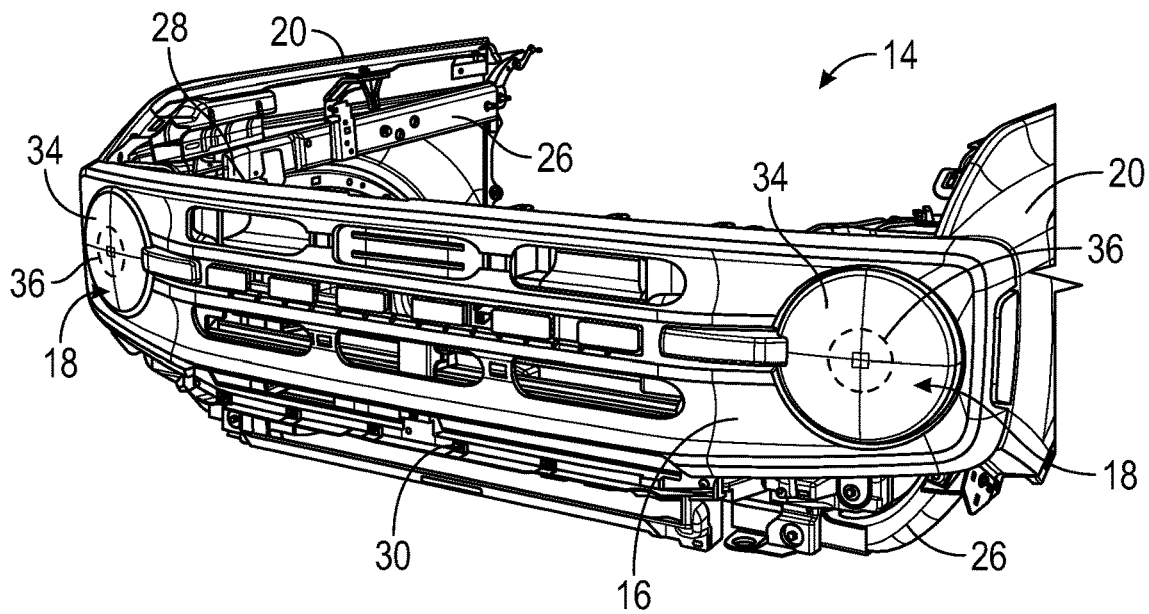
FIG. 2 illustrates a front end assembly of the vehicle of FIG. 1.
Figure 3:
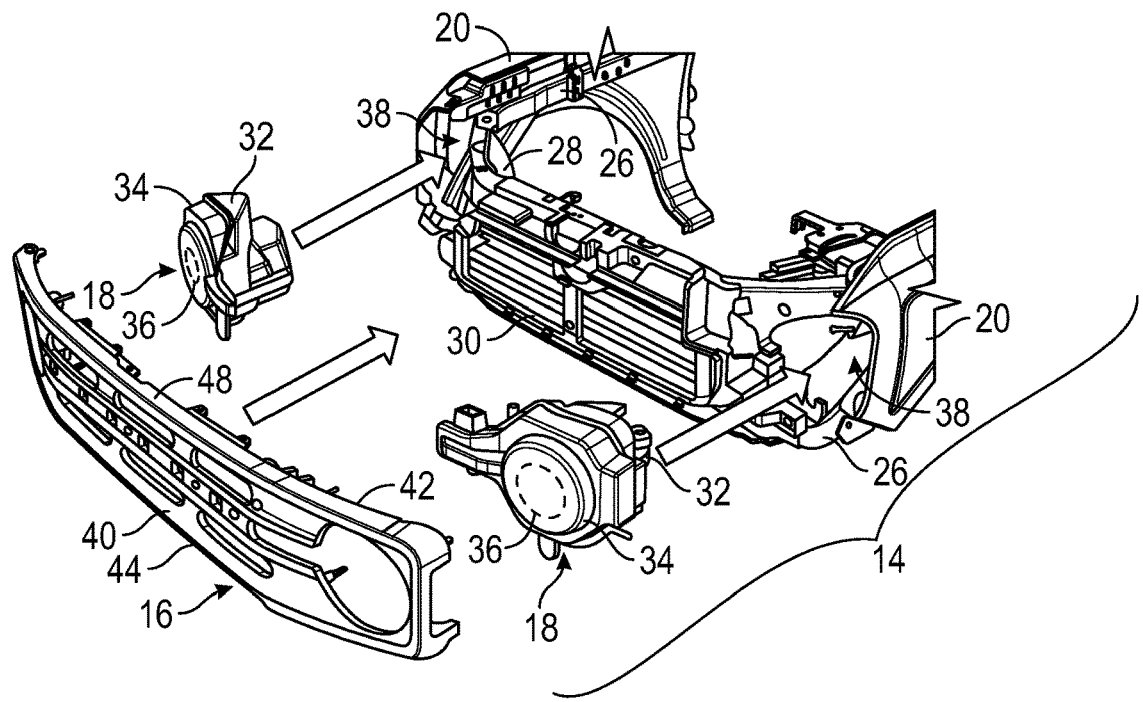
FIG. 3 is an exploded view of the front end assembly of FIG. 2.

FIGS. 2 and 3 illustrate an exemplary front end assembly 14 for a vehicle, such as the vehicle 10 of FIG. 1. The front end assembly 14 may include a grille 16, a pair of headlamp assemblies 18, left and right side fenders 20, and various structural components, such as left and right side hydroform brackets 26 that support the fenders 20 and a bolster 28 and/or an active grille shutter (AGS) housing 30 that connect between the hydroform brackets 26 for supporting the grille 16 and the headlamp assemblies 18. Together, the bolster 28 and the AGS housing 30 may establish a front end structural component that is sometimes referred to as a grille opening reinforcement (GOR).

The teachings of this disclosure are also applicable to vehicles that exclude the AGS and rely primarily on the bolster 28 as the main structural component between the hydroform brackets 26. Thus, the teachings of this disclosure are not limited to the exact configuration shown in FIGS. 2-3.

Each headlamp assembly 18 may include a housing 32, a lens 34, and one or more lights (lamps) 36 for emitting light from the vehicle 10. The headlamp assemblies 18 may be positioned within openings 38 established by the front end structural components (e.g., the bolster 28 and/or the AGS housing 30). The headlamp assemblies 18 and/or the front end structural components may include certain locating and securing features that both support and restrict movement of the headlamp assemblies 18 in one or more directions during assembly. These features may include various slots, holes, surfaces within apertures, pins, straps, tabs, clips, notches, ridges, etc. These features allow the headlamp assemblies 18 to be initially supported in position relative to the fenders 20, the bolster 28, and/or the AGS housing 30 while allowing for some movement in order to align the headlamp assemblies 18 with other components, such as the grille 16, during subsequent assembly steps. In an embodiment, the headlamp assemblies 18 may be supported relative to the front end structural components of the front end assembly 14 such that movement is largely restricted in the X-axis direction but slight movement is permitted in the Y-axis and Z-axis directions. Other configurations in terms of the movement that is permitted or limited are also contemplated within the scope of this disclosure.

The grille 16 may be secured in place relative to the other components of the front end assembly 14 after positioning the headlamp assemblies 18 within the openings 38. For example, the loosely supported headlamp assemblies 18 may be engaged by the grille 16 such that movement of the grille 16 relative to the headlamp assemblies 18 is restricted (and vice versa). The grille 16 and headlamp assemblies 18 may be loosely joined relative to one another such that the subassembly is moveable relative to at least one of the front end structural components. The grille 16 may therefore act as a fixture for properly aligning the headlamp assemblies 18 relative to the grille 16 during assembly, thereby establishing consistent margins and flushness therebetween. In other embodiments, the headlamp assemblies 18 act as fixtures for aligning the grille 16 and the headlamp assemblies 18 relative to one another.

Joining exterior skin components such as the grille 16 and the headlamp assemblies 18 together in the manner described above allows for the incorporation of certain features, including uncommon and/or previously-unobtainable styling improvements. Utilizing one exterior skin component as a locating fixture for one or more other exterior skin components provides for repeatable superior assembly and craftsmanship even when using uncommon styling improvements. By way of one example styling improvement, as best shown in FIG. 2, the front end assembly 14 may be designed such that the headlamp assemblies 18 are surrounded by the grille 16 (i.e., the lenses 34 of the headlamp assemblies 18 are circumscribed by the grille 16). Portions of the headlamp assemblies 18 and the grille 16 may also be intermeshed together to create a meshed subassembly using the assembly process described herein.

The grille 16 may include various features for locating, supporting, loosely connecting, and/or restricting movement of the grille 16 in one or more directions relative to other components of the front end assembly 14 (e.g., the headlamp assemblies 18 and/or the fenders 20). Exemplary locating and supporting features are described in greater detail below with reference to FIGS. 4-10.

Figure 4:
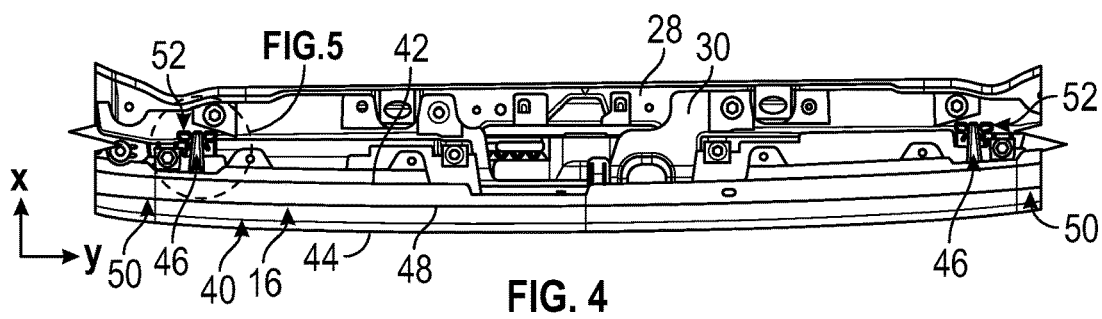
FIG. 4 is a top view of select portions of the front end assembly of FIG. 2.
Figure 5:
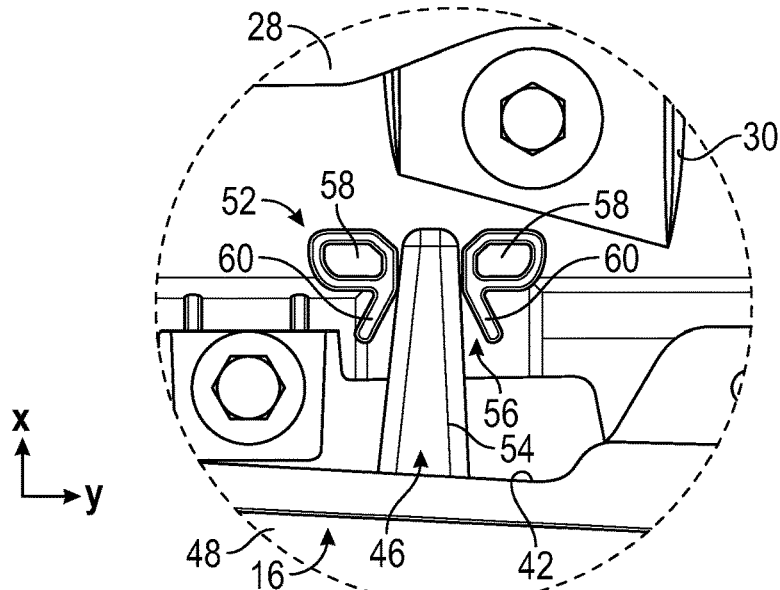
FIG. 5 is a blown-up view of a select portion of FIG. 4.

Referring first to FIGS. 4-5, with continued reference to FIGS. 1-3, the grille 16 may include single piece body 40 that includes an inner surface 42 and an outer surface 44. A pair of first locators 46 may be integrally molded into the single piece body and may protrude from the inner surface 42 of the single piece body 40. In an embodiment, the first locators 46 protrude from an upper rail 48 of the grille 16 at opposing outboard portions 50 of the upper rail 48. However, the first locators 46 could be disposed at any location of the inner surface 42 of the single piece body 40 of the grille 16.

The first locators 46 may engage corresponding first locators 52 of a front end structural component (here, the AGS housing 30) in order to loosely position the grille 16 relative to the front end structural component and for centering the grille 16 relative to the fenders in the Y-axis direction. Providing two of the first locators 46 on the grille 16 rather than a single centerline locator helps enable a more accurate positioning of the grille 16 within the front end assembly 14.

In an embodiment, as best illustrated in FIG. 5, the first locators 46 include tapered pins 54 and the corresponding first locators 52 include tapered slots 56 that receive the tapered pins 54. The tapered pins 54 may taper in a direction away from the inner surface 42 of the grille 16. The tapered slots 56 may extend between stanchions 58 that protrude upwardly from the front end structural component. The stanchions 58 may include tapering walls 60 that guide the tapered pins 54 into the tapered slots 56 as the tapered pins 54 are moved into the tapered slots 56. The tapering walls 60 of the corresponding first locators 52 may restrict movement of the tapered pins 54 in the Y-axis direction while permitting a small amount of upward movement in the Z-axis direction.

Figure 6:
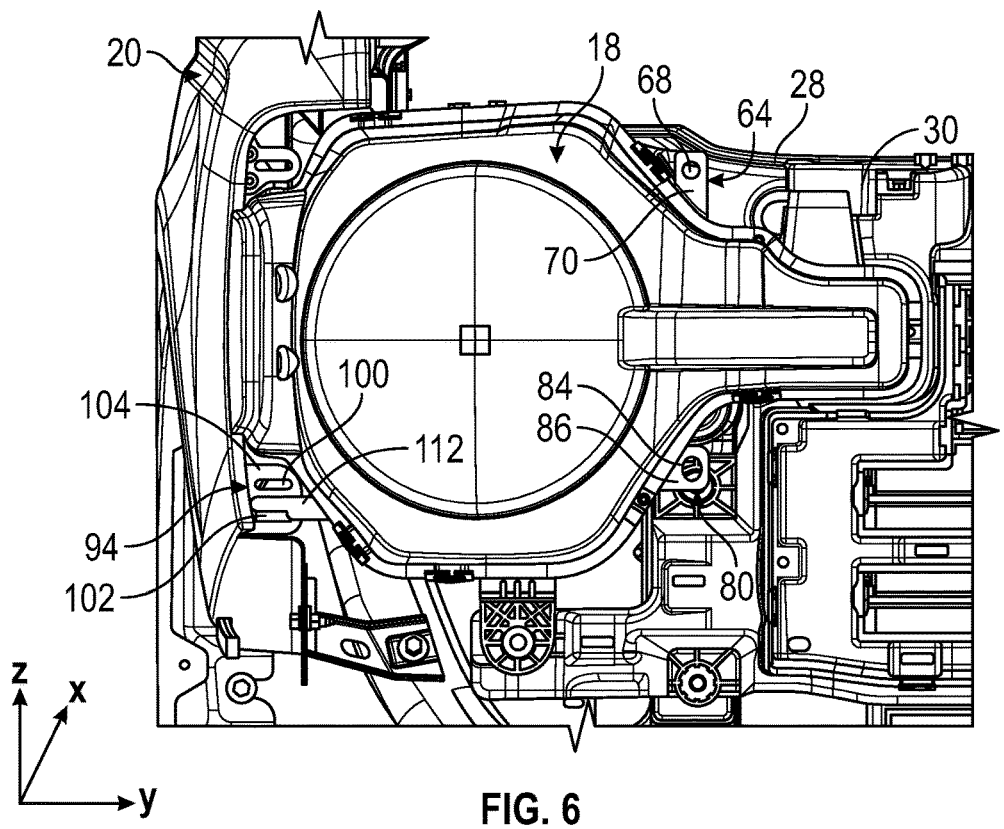
FIG. 6 is a front view of a portion of a front end assembly. A grille of the front end assembly is removed for visualizing locating features of a headlamp assembly of the front end assembly.
Figure 7:
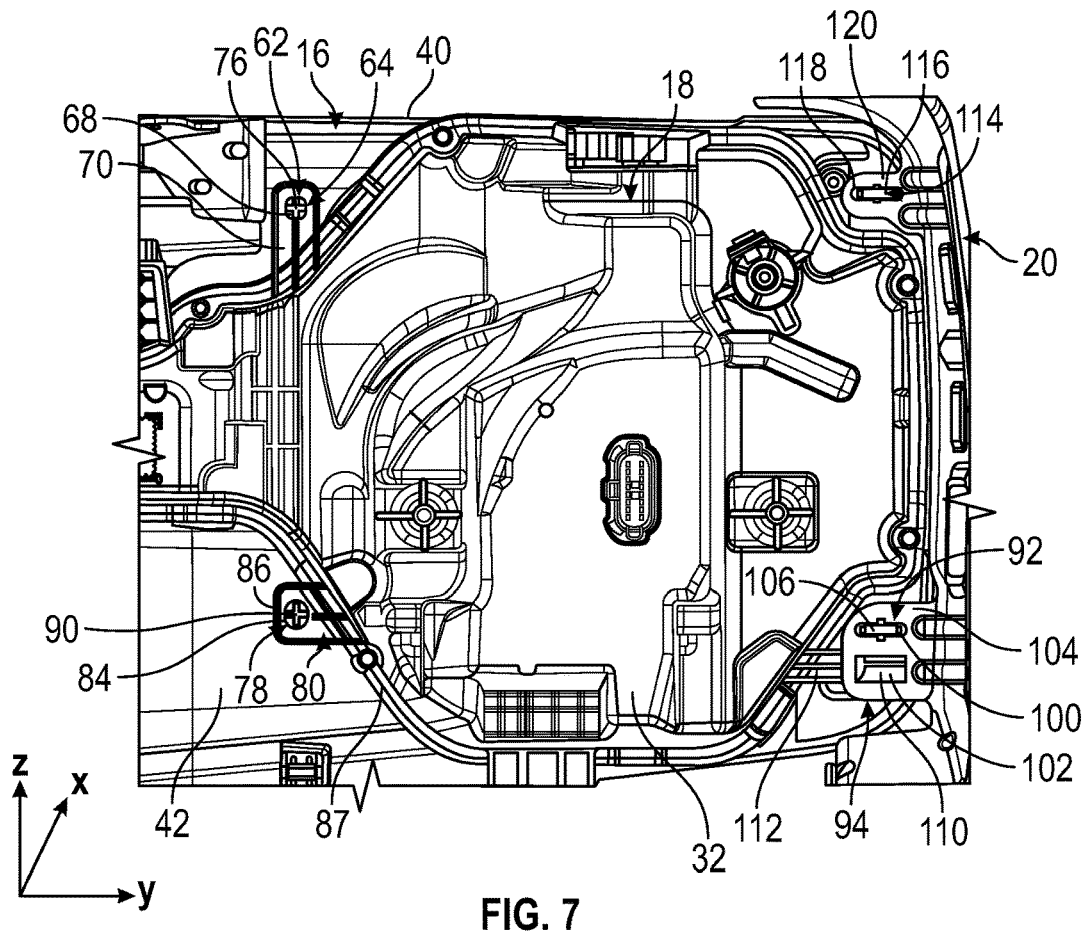
FIG. 7 is a rear view of the portion of the front end assembly shown in FIG. 6.
Figure 8:
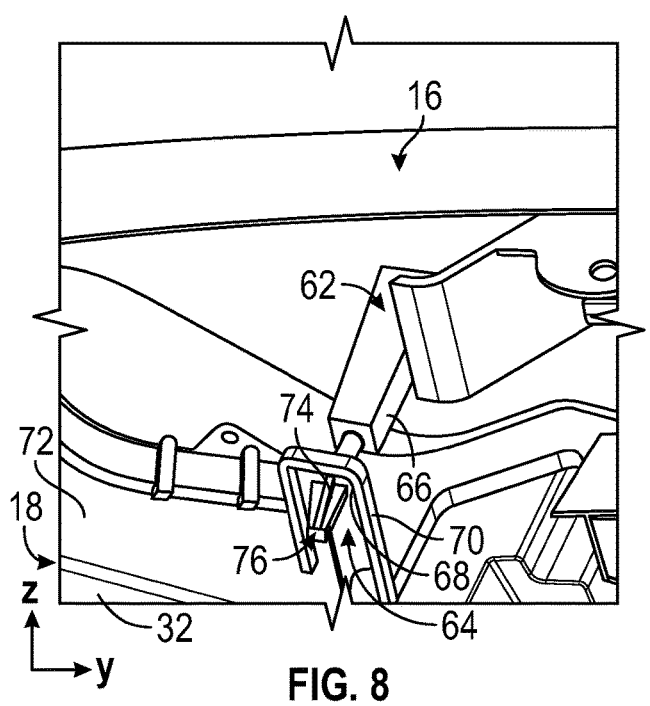
FIG. 8 illustrates a locator of a grille of a front end assembly.

FIGS. 6-8 illustrate a second locator 62 of the grille 16 and a corresponding locator 64 of one of the headlamp assemblies 18. In the illustrated embodiment, the right or passenger side headlamp assembly 18 is depicted for exemplary purposes. The connection between the grille 16 and the left or driver side headlamp assembly 18 could utilize similar locating features and therefore the same description associated with the second locator 62 and the corresponding locator 64 applies equally to the left or driver side headlamp assembly 18.

The second locator 62 may be integrally molded features of the single piece body 40 and may protrude from the inner surface 42 of the single piece body 40 of the grille 16. In an embodiment, the second locators 62 protrude from the inner surface 42 at locations that are outboard of the first locators 46 of the grille 16. However, the second locators 62 could be disposed at any location of the inner surface 42 of the single piece body 40 of the grille 16

The second locator 62 may engage the corresponding locator 64 of the headlamp assembly 18 in order to align and secure the headlamp assembly 18 relative to a side of the grille 16. In an embodiment, the second locator 62 includes a four-way locating pin 66 and the corresponding locator 64 includes an opening (e.g., hole) 68 formed in a lug 70 that protrudes from the housing 32 of the headlamp assembly 18. The lug 70 may protrude from an upper surface 72 of the housing 32, in an embodiment.

The four-way locating pin 66 may include a star pin 74 having a tapered head 76. The tapered head 76 of the star pin 74 may be received within the opening 68 of the lug 70 in order to locate and support the grille 16 and the headlamp assembly 18 relative to one another. Once the tapered head 76 is received within the opening 68, the opening 68 of the lug 70 may restrict movement of the four-way locating pin 66 in each of the Y-axis and Z-axis directions (e.g., in both left and right directions along the Y-axis and in both up and down directions along the Z-axis).

Figure 9:
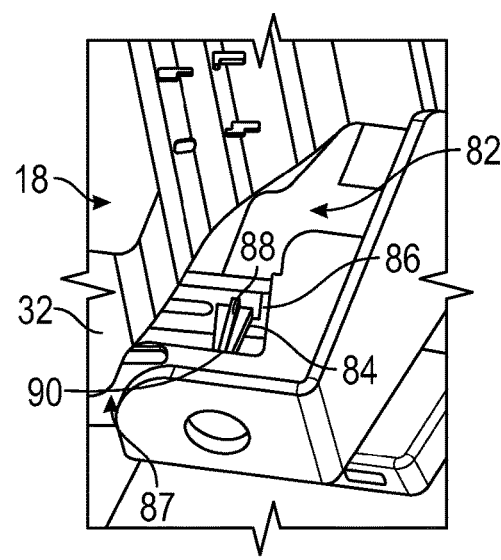
FIG. 9 illustrates another locator of a grille of a front end assembly.

FIGS. 6, 7, and 9 illustrate a third locator 78 of the grille 16 and a corresponding locator 80 of one of the headlamp assemblies 18. In the illustrated embodiment, the right or passenger side headlamp assembly 18 is again depicted for exemplary purposes. The connection between the grille 16 and the left or driver side headlamp assembly 18 could utilize similar locating features and therefore the same description related to the third locator 78 and the corresponding locator 80 applies equally to the left or driver side headlamp assembly 18.

The third locator 78 may be an integrally molded feature that protrudes from the inner surface 42 of the single piece body 40 of the grille 16. In an embodiment, the third locators 78 protrude from the inner surface 42 at locations that are outboard of the first locators 46 of the grille 16. However, the third locators 78 could be disposed at any location of the inner surface 42 of the single piece body 40 of the grille 16

The third locator 78 may engage the corresponding locator 80 of the headlamp assembly 18 in order to further align and secure the headlamp assembly 18 relative to a side of the grille 16. In an embodiment, the third locator 78 includes a two-way locating pin 82 and the corresponding locator 80 includes a slot 84 formed in a lug 86 that protrudes from the housing 32 of the headlamp assembly 18. The lug 86 is a separate lug from the lug 70 and may protrude from a lower surface 87 of the housing 32, in an embodiment.

The two-way locating pin 82 may include a star pin 88 having a tapered head 90. The tapered head 90 of the star pin 88 may be received at least partially through the slot 84 of the lug 86 in order to further locate and position the grille 16 and the headlamp assembly 18 relative to one another. Once the tapered head 90 is received within the slot 84, the slot 84 of the lug 86 may restrict left and right movement of the two-way locating pin 82 in the Y-axis direction while permitting a small amount of up and down movement in the Z-axis direction.

Figure 10:
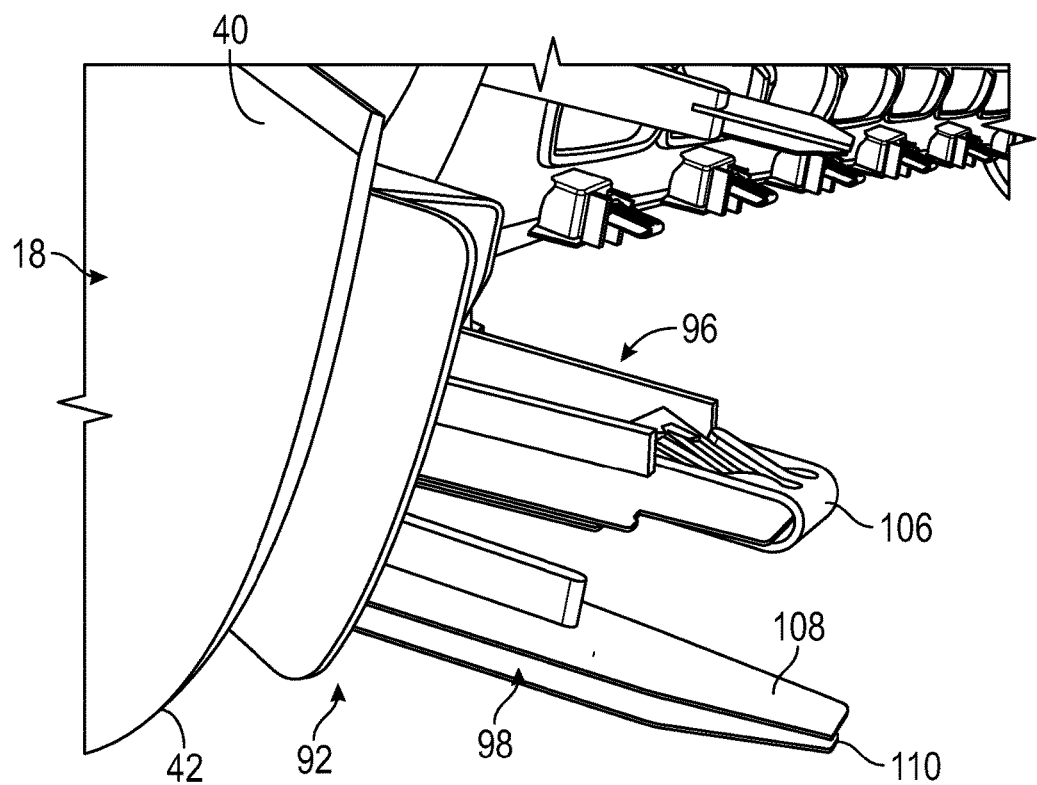
FIG. 10 illustrates yet another locator of a grille of a front end assembly.

FIGS. 6-7 and 10 illustrate a fourth locator 92 of the grille 16 and a corresponding locator 94 of one of the fenders 20. In the illustrated embodiment, the right or passenger side fender 20 is depicted for exemplary purposes. The connection between the grille 16 and the left or driver side fender 20 could utilize similar locating features and therefore the same description related to the fourth locator 92 and the corresponding locator 94 applies equally to the left or driver side fender 20.

The fourth locator 92 may be integrally molded with and protrude from the inner surface 42 of the single piece body 40 of the grille 16. In an embodiment, the fourth locators 92 protrude from the inner surface 42 at locations that are outboard of the first locators 46, the second locators 62, and the third locators 78 of the grille 16. However, the fourth locators 92 could be disposed at any location of the inner surface 42 of the single piece body 40 of the grille 16

The fourth locator 92 may engage the corresponding locator 94 of the fender 20 in order to align and secure the grille 16 relative to the fender 20. In an embodiment, the fourth locator 92 is a two-stage locator that includes both a first locating pin 96 and a second locating pin 98, and the corresponding locator 94 includes a first slot 100 and a second slot 102 formed in a lug 104 that protrudes from the fender 20.

The first locating pin 96 of the fourth locator 92 may include an attachment clip 106 for tabbing the grille 16 to the fender 20. The attachment clip 106 may be received within the first slot 100 of the lug 104 of the fender 20 in order to control fore/aft movement of the grille 16 relative to the fender 20 along the X-axis.

The second locating pin 98 of the fourth locator 92 may include a star pin 108 having a tapered head 110. The tapered head 110 of the star pin 108 may be received at least partially through the second slot 102 of the lug 104 in order to further locate and position the grille 16 and the fender 20 relative to one another. Once the tapered head 110 is received within the second slot 102, the slot 102 of the lug 104 may restrict up and down movement of the second locating pin 98 in the Z-axis direction while permitting a small amount of left and right movement in the Y-axis direction.

The second locating pin 98 may extend beneath an extension 112 of the housing 32 of the headlamp assembly 18 such that the extension 112 rests on top of a portion of the second locating pin 98. The second locating pin 98 may therefore help control a Z-axis height of the headlamp assembly 18.

An additional locator 114 (e.g., a fifth locator) of the grille 16 may be used to further tab the grille 16 to the fender 20. The locator 114 may include an attachment clip 116 that may engage a slot 118 of an additional lug 120 of the fender 20 in order to restrict fore/aft movement of the grille 16 relative to the fender 20 along the X-axis.

The vehicle front end assemblies of this disclosure provide various locating features for locating and supporting loose layered build components of the assembly relative to one another. The locating features may locate the loose layered build components in each of the X-axis, Y-axis, and Z-axis directions, thereby controlling margins and flushness between the components and simplifying the overall assembly process.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle front end assembly, comprising:
   a structural component;
   a headlamp assembly positioned relative to the structural component; and
   a grille positioned relative to the structural component and the headlamp assembly,
   wherein the grille includes a first locator adapted for centering the grille relative to the structural component, a second locator adapted for locating the grille relative to a first portion of the headlamp assembly, and a third locator for locating the grille relative to a second portion of the headlamp assembly,
   wherein the first locator includes a tapered pin that engages a tapered slot provided by the structural component,
   wherein the tapered slot is established by a first tapering wall of a first stanchion and a second tapering wall of a second stanchion of the structural component.

2. The assembly as recited in claim 1, wherein the structural component includes a bolster.

3. The assembly as recited in claim 1, wherein the structural component includes an active grille shutter (AGS) housing.

4. The assembly as recited in claim 1, wherein the grille includes an additional first locator located on an opposite outboard side of the grille from the first locator.

5. The assembly as recited in claim 1, wherein the second locator includes a four-way locating pin that engages an opening formed in a lug of the headlamp assembly.

6. The assembly as recited in claim 5, wherein the four-way locating pin includes a star pin having a tapered head that is received within the opening of the lug.

7. The assembly as recited in claim 1, wherein the third locator includes a two-way locating pin that engages a slot formed in a lug of the headlamp assembly.

8. The assembly as recited in claim 7, wherein the two-way locating pin includes a star pin having a tapered head that is received within the slot of the lug.

9. A vehicle front end assembly, comprising:
   a structural component;
   a headlamp assembly positioned relative to the structural component; and a grille positioned relative to the structural component and the headlamp assembly, wherein the grille includes a first locator adapted for centering the grille relative to the structural component, a second locator adapted for locating the grille relative to a first portion of the headlamp assembly, and a third locator for locating the grille relative to a second portion of the headlamp assembly, wherein the grille includes a fourth locator adapted for locating the grille relative to a fender.

10. The assembly as recited in claim 9, wherein the fourth locator is a two-stage locator that includes a first locating pin that engages a first slot of a lug of the fender and a second locating pin that engages a second slot of the lug of the fender.

11. The assembly as recited in claim 10, wherein the first locating pin includes an attachment clip received within the first slot and the second locating pin includes a tapered head received within the second slot.

12. The assembly as recited in claim 11, wherein the grille includes a fifth locator that includes an attachment clip received within a slot of a second lug of the fender.

13. The assembly as recited in claim 10, wherein the second locating pin extends underneath an extension of a housing of the headlamp assembly.

14. A vehicle front end assembly, comprising:
a structural component;
a bolster secured to the structural component;
an active grille shutter housing secured to the bolster to establish a grille opening reinforcement (GOR);
a headlamp assembly secured relative to the active grille shutter housing and the bolster;
a fender secured relative to the structural component;
a grille secured relative to the GOR, the headlamp assembly, and the fender;
the grille including a pair of tapered pins adapted for centering the grille relative to a pair of corresponding locators on the active grille shutter housing;
the grille including a four-way locating pin adapted for locating the grille relative to a first corresponding locator on the headlamp assembly;
the grille including a two-way locating pin adapted for locating the grille relative to a second corresponding locator on the headlamp assembly; and
the grille including a two-stage locator adapter for locating the grille relative to a corresponding locator on the fender.

15. The assembly as recited in claim 14, wherein each corresponding locator of the pair of corresponding locators on the active grille shutter housing includes a tapered slot established by a first tapering wall of a first stanchion and a second tapering wall of a second stanchion on the active grille shutter housing.

16. The assembly as recited in claim 14, wherein the first corresponding locator of the headlamp assembly includes a first slot formed in a first lug of the headlamp assembly.

17. The assembly as recited in claim 16, wherein the second corresponding locator of the headlamp assembly includes a second slot formed in a second lug of the headlamp assembly.

18. The assembly as recited in claim 14, wherein the corresponding locator of the fender includes a first slot and a second slot formed in a lug of the fender, wherein the first slot receives an attachment clip of the two-stage locator and the second slot receives a tapered head of the two-stage locator.

* * * * *

UNITED STATES PATENT AND TRADEMARK OFFICE
CERTIFICATE OF CORRECTION

PATENT NO. : 11,214,313 B2
APPLICATION NO. : 16/707038
DATED : January 4, 2022
INVENTOR(S) : David Brian Glickman et al.

Page 1 of 1

It is certified that error appears in the above-identified patent and that said Letters Patent is hereby corrected as shown below:

In the Claims

In Claim 14, Column 10, Line 12; replace "two-stage locator adapter for" with --two-stage locator adapted for--

Signed and Sealed this
First Day of March, 2022

Drew Hirshfeld
*Performing the Functions and Duties of the
Under Secretary of Commerce for Intellectual Property and
Director of the United States Patent and Trademark Office*